(12) United States Patent
Bland

(10) Patent No.: US 11,260,995 B2
(45) Date of Patent: Mar. 1, 2022

(54) SPACECRAFT HIGH TENSILE FABRIC BARRIER FOR HOT RE-ENTRY GASES

(71) Applicant: The Boeing Company, Chicago, IL (US)

(72) Inventor: Mitchell C. Bland, Houston, TX (US)

(73) Assignee: THE BOEING COMPANY, Chicago, IL (US)

( * ) Notice: Subject to any disclaimer, the term of this patent is extended or adjusted under 35 U.S.C. 154(b) by 348 days.

(21) Appl. No.: 16/173,821

(22) Filed: Oct. 29, 2018

(65) Prior Publication Data

US 2020/0130867 A1    Apr. 30, 2020

(51) Int. Cl.
| | |
|---|---|
| *B32B 3/12* | (2006.01) |
| *B64G 1/12* | (2006.01) |
| *B64G 1/14* | (2006.01) |
| *B64C 1/40* | (2006.01) |
| *B64G 1/62* | (2006.01) |
| *B32B 15/00* | (2006.01) |
| *B32B 5/26* | (2006.01) |
| *B32B 5/02* | (2006.01) |
| *B32B 7/12* | (2006.01) |
| *E21C 51/00* | (2006.01) |

(52) U.S. Cl.
CPC .................. *B64G 1/12* (2013.01); *B32B 3/12* (2013.01); *B32B 5/024* (2013.01); *B32B 5/26* (2013.01); *B32B 7/12* (2013.01); *B32B 15/00* (2013.01); *B64C 1/40* (2013.01); *B64G 1/14* (2013.01); *B64G 1/62* (2013.01); *E21C 51/00* (2013.01)

(58) Field of Classification Search
None
See application file for complete search history.

(56) References Cited

U.S. PATENT DOCUMENTS

| | | | | |
|---|---|---|---|---|
| 5,399,418 A | * | 3/1995 | Hartmanns | B64G 6/00 139/420 R |
| 6,467,731 B1 | * | 10/2002 | Harris | B64G 1/58 244/159.1 |
| 2003/0114064 A1 | * | 6/2003 | Fu | B64C 1/1469 442/239 |

(Continued)

OTHER PUBLICATIONS

Gas Laws, Apr. 27, 2017 (Year: 2017).*
Definition of bond, lexico.com, Aug. 30, 2021 (Year: 2021).*
Merriam-Webster Thesaurus bonded, Aug. 30, 2021, (Year: 2021).*

*Primary Examiner* — Mary I Omori
(74) *Attorney, Agent, or Firm* — Parsons Behle & Latimer

(57) ABSTRACT

A multi-layer shell structure for a vehicle and method of providing a multi-layer shell structure for a vehicle. The multi-layer structure includes a thermal protection system (TPS) layer, a structural layer connected to the TPS layer, and a high tensile fabric barrier layer bonded to the structural layer. Room-temperature-vulcanizing silicone may be used to bond the TPS layer to the structural layer and bond the high tensile fabric barrier layer to the structural layer. The high tensile fabric barrier layer may create a seal on the structural layer. The multi-layer shell structure may include inner shell enclosing a passenger and/or cargo compartment and an annulus between the inner shell and the high tensile fabric barrier layer. The high tensile fabric barrier layer may prohibit entry of gas into the annulus in the event a hole is created through a portion of the multi-layer shell structure.

20 Claims, 5 Drawing Sheets

(56) References Cited

U.S. PATENT DOCUMENTS

| | | | | |
|---|---|---|---|---|
| 2004/0126537 A1* | 7/2004 | Jackson | ................ | E04C 2/365 |
| | | | | 428/118 |
| 2005/0089661 A1* | 4/2005 | Hogenson | ............... | B64G 1/14 |
| | | | | 428/36.5 |
| 2009/0108137 A1* | 4/2009 | Simon | .................. | B64G 1/002 |
| | | | | 244/171.3 |
| 2012/0186433 A1* | 7/2012 | Braiewa | ............... | F41H 5/0471 |
| | | | | 89/36.02 |

* cited by examiner

SPACECRAFT HIGH TENSILE FABRIC BARRIER FOR HOT RE-ENTRY GASES

GOVERNMENT RIGHTS

This invention was made with Government support under contract number NNK14MA75C awarded by the NASA. The government has certain rights in this invention.

International Traffic in Arms Regulations (ITAR) Notice

This document contains information which falls under the purview of the U.S. Munitions List (USML), as defined in the International Traffic in Arms Regulations (ITAR), 22 CFR 120-130, and is export controlled. It shall not be transferred to foreign nationals, in the U.S. or abroad, without specific approval of a knowledgeable NASA export control official, and/or unless an export license/license exemption is obtained/available from the United States Department of State. Violations of these regulations are punishable by fine, imprisonment, or both.

BACKGROUND

Field of the Disclosure

The examples described herein relate to a high tensile fabric barrier layer to prevent the ingress of hot re-entry gases into a spacecraft, and methods of providing a high tensile fabric barrier layer to a spacecraft to prevent the ingress of hot re-entry gases.

Description of the Related Art

A spacecraft typically includes a thermal protection system (TPS) on the exterior of the vehicle to protect a compartment for passengers and/or cargo within an interior shell from high temperature gases during re-entry into the atmosphere. When the spacecraft is in orbit in outer space the spacecraft may be exposed to meteoroid and/or orbital debris particles. These particles may impact the spacecraft during orbit, which may damage the spacecraft depending the diameter of the particles as well as the velocity of the particles. Present spacecraft may include an intermediate debris shield positioned between interior shell and the exterior shell, which typically includes TPS bonded to a structural layer. The intermediate debris shield is designed to be a sacrificial shield that is spaced apart from both the exterior shell and the interior shell. The intermediate debris shield is designed break up particles that penetrate the exterior shell to be prevent penetration of the interior shell by the particles. The intermediate sacrificial debris shield is intentionally spaced apart from the exterior and interior shells to potentially reduce the energy of particles before impacting the interior shell. The intermediate shell does not prevent ingress of high temperature gases into the spacecraft through holes in the exterior shell created by impact meteoroid and/or debris particles. Other disadvantages may exist.

SUMMARY

The present disclosure is directed to a multi-layer shell structure for a spacecraft that includes to a high tensile fabric barrier layer to prevent the ingress of hot re-entry gases into an annulus within the spacecraft.

One example of the present disclosure is a multi-layer shell structure for a vehicle comprising a thermal protection system (TPS) layer and a structural layer connected to the TPS layer. The multi-layer shell structure comprises a high tensile fabric barrier layer bonded to the structural layer.

The high tensile fabric barrier layer may create a seal on an exterior of the structural layer of the multi-layer shell structure. The multi-layer shell structure may include inner shell enclosing a compartment. The multi-layer shell structure may include an annulus between an exterior of the inner shell and the high tensile fabric barrier layer. The high tensile fabric barrier layer may prohibit an entry of gas into the annulus in the event a hole is created through the TPS layer and the structural layer. The high tensile fabric barrier layer may be configured to prohibit the entry of gas into the annulus up to a temperature of at least 800 degrees Fahrenheit.

The annulus may have a pressure below a pressure exterior of the TPS layer. The structural layer of the multi-layer structure may include a composite honeycomb with a core. The inner shell of the multi-layer structure may be aluminum. The high tensile fabric barrier layer may be bonded to the structural layer via a layer of room-temperature-vulcanizing silicone. The high tensile fabric barrier layer may have a tensile strength of 3,000 MPa or greater. The high tensile fabric barrier layer may be comprised of a plurality of plies of high tensile fabric woven together to form the high tensile fabric barrier layer. The high tensile fabric barrier layer may comprise at least ten plies of high tensile fabric.

One example of the present disclosure is a spacecraft comprising a multi-layer shell structure having a windward side and a leeward side. The spacecraft comprises a compartment positioned within the multi-layer shell structure and an annulus between the compartment and the multi-layer shell structure. The spacecraft includes a plurality of high tensile fabric barrier segments on the windward side of the multi-layer shell structure, the plurality of high tensile fabric barrier segments each are bonded to the multi-layer shell structure and each are positioned adjacent to the annulus. The plurality of high tensile fabric segments prohibits an entry of gas into the annulus in the event a hole is created through a portion of the multi-layer shell structure.

The multi-layer structure may include a thermal protection system (TPS) layer and a structural layer connected to the TPS layer. Each of the plurality of high tensile fabric barrier segments may be bonded to the structural layer. Room-temperature-vulcanizing silicone may bond each segment of the plurality of high tensile fabric barrier segments to the structural layer. The annulus may have a pressure below a pressure exterior of the TPS layer. The plurality of high tensile fabric barrier segments may be comprised of high tensile yarn woven into high tensile fabric plies with the plurality of high tensile fabric barrier segments each comprising multiple high tensile fabric plies woven together to form the high tensile fabric barrier segments. Each of the plurality of high tensile fabric barrier segments may comprise at least ten high tensile fabric plies.

One example of the present disclosure is a method of providing a multi-layer shell structure for a vehicle. The method comprises coupling a thermal protection system (TPS) layer to a structural layer. The method includes bonding a high tensile fabric barrier layer to the structural layer, wherein the TPS layer, the structural layer, and the high tensile fabric barrier layer form multi-layer shell structure enclosing a compartment. The method comprises providing an annulus between the high tensile fabric barrier layer and the compartment. The high tensile fabric barrier layer may be bonded to the structural layer with room-temperature-vulcanizing silicone.

Figure 1:
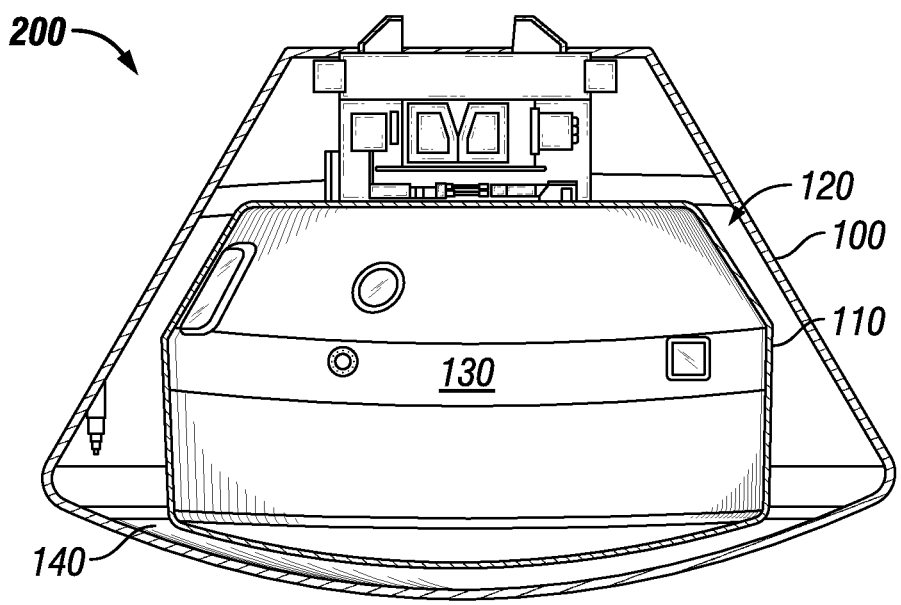
FIG. 1 is a schematic of an example of a vehicle with a multi-layer shell structure that includes a high tensile fabric barrier layer.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

FIG. 1 is a schematic of one example of a vehicle 200 with a multi-layer shell structure 100. The vehicle 200 may be, but is not limited to, a spacecraft. The vehicle 200 includes an inner shell 110 positioned within the multi-layer shell structure 100. A compartment 130 is positioned within the inner shell 110. The compartment 130 may be configured for passengers, cargo, or both as would be appreciated by one of ordinary skill in the art having the benefit of this disclosure. The inner shell 110 may be comprised of various materials as would be appreciated by one of ordinary skill in the art having the benefit of this disclosure. For example, the inner shell 110 may be comprised of, but is not limited to, aluminum. The vehicle 200 includes a bottom 140 that encloses the multi-layer shell structure 100. The exterior of the multi-layer shell structure 100 and bottom 140 may include structures that shield the interior of the vehicle from the high temperatures that may be experienced if the vehicle is used to re-enter the atmosphere. For example, the exterior of the multi-layer shell structure 100 may include tiles, or the like, configured to prevent heat transfer to the interior of the vehicle 200. Likewise, the exterior of the bottom 140 may include material configured to ablate to prevent heat transfer to the interior of the vehicle 200. For example, the exterior surface of the bottom 140 may include ablative material that undergoes ablation and carries heat away from the vehicle 200.

Figure 2:
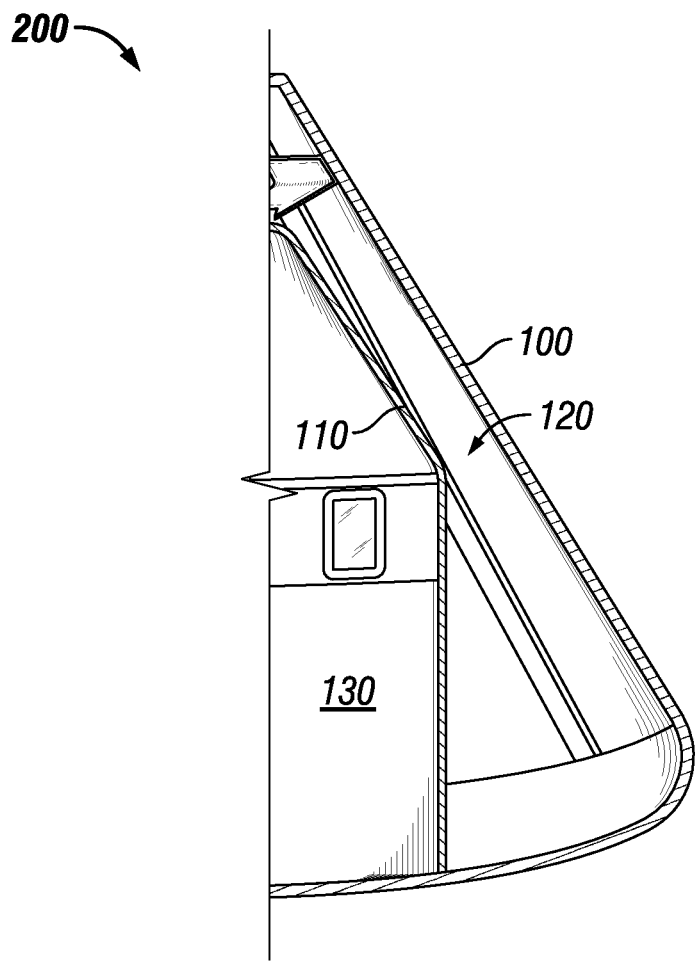
FIG. 2 is a close-up schematic of an example of a multi-layer shell structure that includes a high tensile fabric barrier layer.

FIG. 2 shows a close-up schematic view of a portion of the vehicle 200. The vehicle 200 includes an annulus 120 positioned between the multi-layer shell structure 100 and the inner shell 110. The annulus 120 is a gap, or void, positioned between the multi-layer shell structure 100 and the inner shell 110 that substantially surrounds the entire perimeter of the inner shell 110. I-beams (not shown) positioned within the annulus 120 connect the multi-layer shell structure 100 to the inner shell 110. Various utilities such as wires (not shown), ventilation (not shown), humidity control (not shown), and/or a battery (not shown) may be positioned within the annulus 120. In one example, the annulus 120 may be a void with a width of approximately five (5) inches between the inner shell 110 and the multi-layer shell structure 100.

Figure 3:
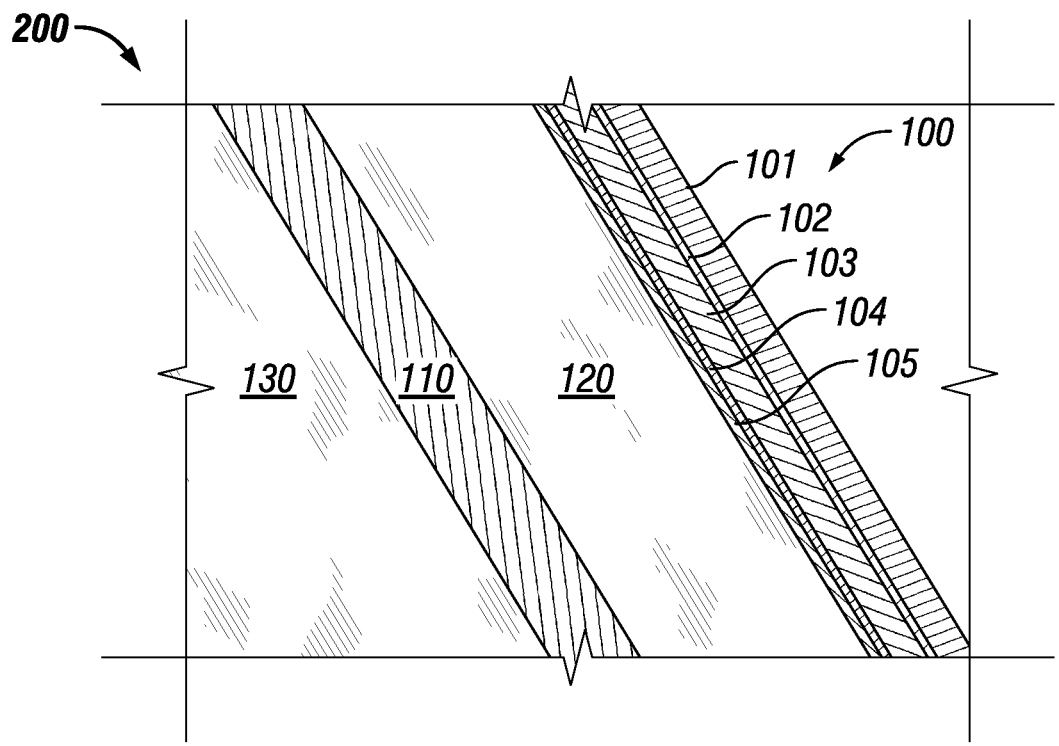
FIG. 3 is a close-up schematic of an example of a multi-layer shell structure that includes a high tensile fabric barrier layer.

The multi-layer shell structure 100 is comprised of an outer, or exterior, thermal protection system (TPS) with a layer of bonding material 102 bonding the exterior of TPS layer 101 to a structural layer 103 as shown in the close-up schematic view of FIG. 3. The layer of bonding material 102 may be, but is not limited to, room-temperature-vulcanizing silicone. A high tensile fabric barrier layer 105 is bonded to the exterior of the structural layer 103 by a layer of bonding material 104. The layer of bonding material 104 may be, but is not limited to, room-temperature-vulcanizing silicone. The high tensile fabric barrier layer 105 is positioned adjacent to the annulus 120.

The high tensile fabric barrier layer 105 is bonded to the interior surface of the structural layer 103 to form a seal on the interior surface of the structural layer 103. The high tensile fabric barrier layer 105 is configured to prevent the ingress of high temperature gas into the annulus 120 of the vehicle 200 in the event a hole is created through the TPS layer 101 and the structural layer 103.

The purpose of the TPS layer 101 is to prevent heat transfer to the interior of the vehicle 200 and, in particular, to prevent heat transfer into the compartment 130. The TPS layer 101 may be comprised of various insulative materials, which may be fragile. The insulative materials of the TPS layer 101 may be susceptible to damage upon impact from debris while traveling in outer space. The high tensile fabric barrier 105 is configured to prevent ingress of high temperature gases into the annulus 120 during re-entry into the atmosphere in the event a hole formed in the TPS layer 101 and the structural layer 103. For example, a particle may impact the multi-layer shell structure 100 of the vehicle 200 creating a hole through a portion of the layers of the multi-layer shell structure 100.

One purpose of the structural layer 103 is to provide support to the TPS layer 101. The structural layer 103 is connected to the I-beams (not shown) positioned within the annulus 120 to connect the multi-layer shell structure 100 to the inner shell 110. The structural layer 103 is configured to provide adequate support to the multi-layer shell structure 100 for the loads during ascent and re-entry of the vehicle 200. In one example, the structural layer 103 may be a honeycomb structure positioned between composite faceplates. In one example, the structural layer 103 may be approximately one (1) inch thick. The structural layer 103 is configured to withstand the external forces applied to the vehicle 200 during re-entry due to gravity and drag.

The high tensile fabric barrier layer 105 may be comprised of various materials as would be appreciated by one of ordinary skill in the art having the benefit of this disclosure. For example, the high tensile fabric barrier may comprise a wholly aromatic carbocyclic polycarbonamide fiber, e.g. Kevlar, that is woven into a fabric sheet, or blanket. The high tensile fabric may be comprised of other high tensile materials, such as, but not limited to, Zylon fiber, Twaron fiber, Spectra fiber, and the like, and combinations thereof.

The high tensile fabric barrier layer 105 may be comprised of a material that can withstand high temperatures and have a high tensile strength. For example, the high tensile fabric barrier layer 105 may be able to withstand high temperature gases having a temperature of at least 800 degrees Fahrenheit without breaking down enabling the high tensile fabric barrier layer 105 to prevent ingress of the high temperature gases. The high tensile fabric barrier layer 105 may be configured to withstand high temperature gases having a temperature of at least 1000 degrees Fahrenheit without breaking down enabling the high tensile fabric barrier layer 105 to prevent ingress of the high temperature gases.

The high tensile fabric barrier layer 105 may be configured to have a tensile strength of at least 3,000 MPa to withstand impacts from debris to the multi-layer shell structure 100. The high tensile fabric barrier layer 105 may be configured to have a tensile strength higher than 3,000 MPa. For example, the high tensile fabric barrier layer 105 may be configured to have a tensile strength of at least 4,000 MPa.

Figure 4:
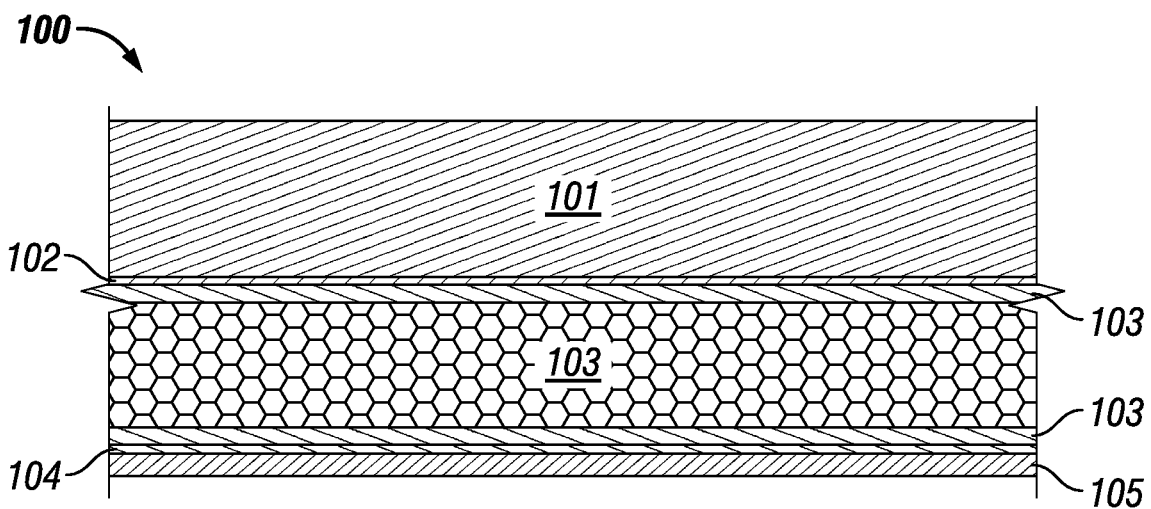
FIG. 4 is a schematic of an example of a multi-layer shell structure that includes a high tensile fabric barrier layer.

FIG. 4 shows a cross-section schematic of one example of a multi-layer shell structure 100. A TPS layer 101 is position on the exterior of the multi-layer shell structure 100. The TPS layer 101 is configured to shield the interior of the multi-layer shell structure 100 from high temperatures. The TPS layer 101 is bonded via a bonding layer 102 to a structural layer 103, which may be a honeycomb structure positioned between faceplates. The structural layer 103 is bonded to a high tensile fabric barrier layer 105 via a bonding layer 104. Various materials may be used as the bonding layers. For example, the bonding layers 102, 104 may be comprised of, but are not limited to, room-temperature-vulcanizing silicone. The size, shape, and/or configuration of the TPS layer 101, bonding layers 102, 104, structural layer 103, and the high tensile fabric barrier layer 105 are shown for illustrative purposes and may be varied depending on the application as would be appreciated by one of ordinary skill in the art having the benefit of this disclosure. For example, the thickness of each of the layers 101-105 of the multi-layer shell structure 100 may be varied from depicted in FIG. 4.

Figure 5:
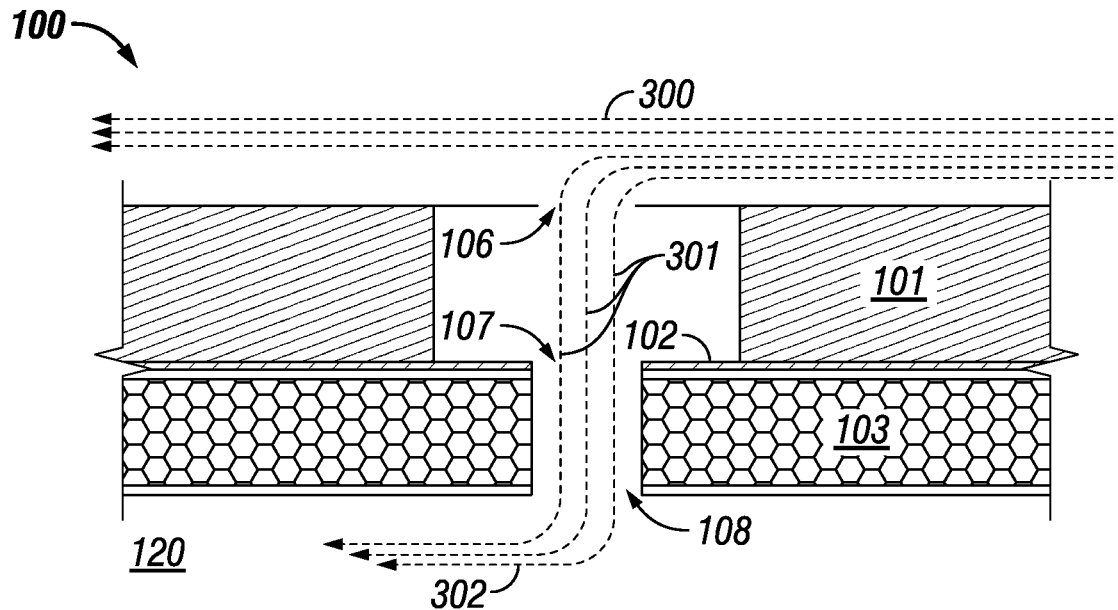
FIG. 5 is a schematic of an example an example of a multi-layer shell structure with a hole formed through the multi-layer shell structure.

FIG. 5 is a schematic showing a hole through a multi-layer shell structure 100 comprised of a TPS layer 101 bonded to a structural layer 103 via a bonding layer 102. A hole, or opening, 106 has been created through the TPS layer 101. Likewise, a hole, or opening, 107 has been created through the bonding layer 102 and a hole, or opening, 108 has been created through the structural layer 103. For example, a particle may have impacted the exterior of the multi-layer shell structure 100 and formed holes 106, 107, 108 through the various layers 101, 102, 103 of the multi-layer shell structure 100. The holes 106, 107, 108 provide a flow path from the exterior of the multi-layer shell structure 100 and the annulus 120. The holes 106, 107, 108 in the multi-layer shell structure 100 permit high temperature gases 300 flowing along the exterior of the multi-layer shell structure 100 to enter into the multi-layer shell structure 100, as indicated by 301, and flow into the annulus 120, as indicated by 302. As discussed herein, the annulus 120 may be at a lower pressure than the exterior of the multi-layer shell structure 100. The lower pressure within the annulus 120 may draw the high temperature gases into the annulus 120 via the holes 106, 107, 108 through the layers 101-103 of the multi-layer shell structure 100.

Figure 6:
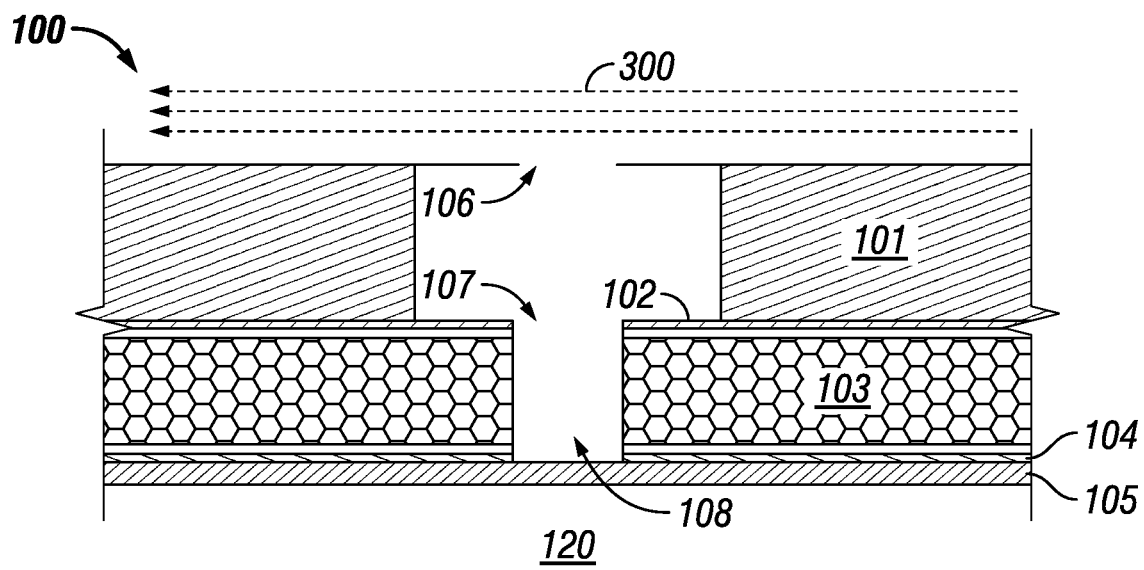
FIG. 6 is a schematic of an example of a multi-layer shell structure that includes a high tensile fabric barrier layer with a hole formed through a portion of the multi-layer shell structure.

FIG. 6 is a schematic showing a hole through a portion of a multi-layer shell structure 100. The multi-layer shell structure 100 is comprised of a TPS layer 101 bonded to an exterior of a structural layer 103 via a bonding layer 102 and a high tensile fabric barrier layer 105 bonded to an interior of the structural layer 103 via a bonding layer 104. A hole, or opening, 106 has been created through the TPS layer 101. Likewise, a hole, or opening, 107 has been created through the bonding layer 102 and a hole, or opening, 108 has been created through the structural layer 103. For example, a particle may have impacted the exterior of the multi-layer shell structure 100 and formed holes 106, 107, 108 through the various layers 101, 102, 103 of the multi-layer shell structure 100. A hole, or opening, is not created through the high tensile fabric barrier layer 105. The high tensile fabric barrier layer 105 creates a seal on the interior of the structural layer 103. The high tensile fabric barrier layer 105 prevents the lower pressure of the annulus 120 from drawing the high temperature gases 300 into the holes 106, 107, 108. Further, the high tensile fabric barrier layer 105 prevents the high temperature gases 300 from entering into the annulus 120 to the extent the high temperature gases 300 enter into the holes 106, 107, 108 formed into a portion of the multi-layer shell structure 100.

Figure 7:
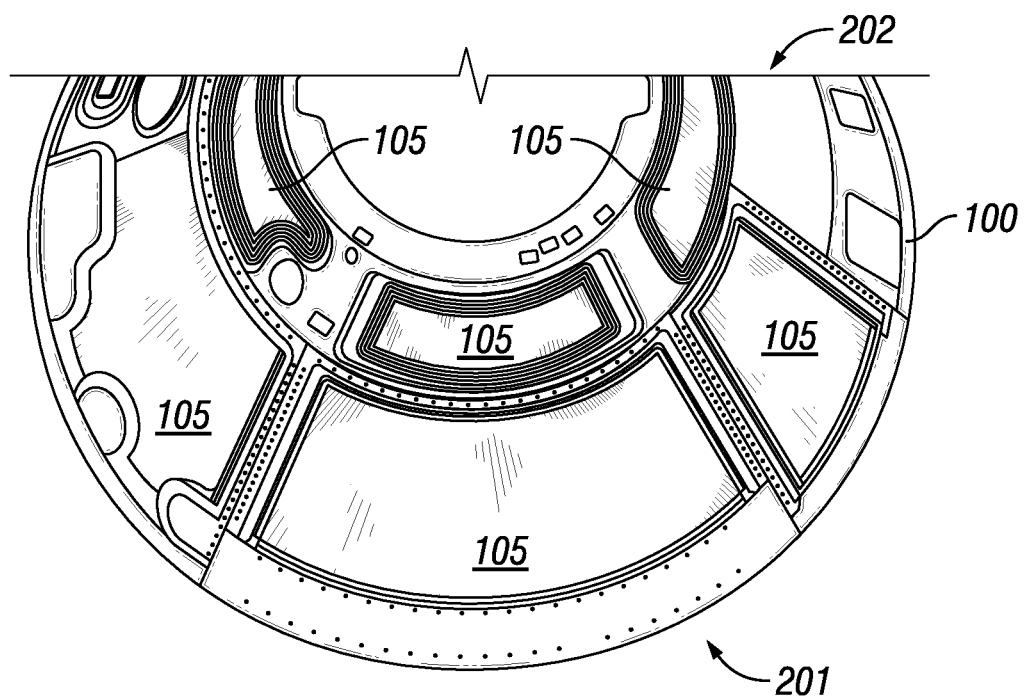
FIG. 7 is a schematic of an interior portion of a multi-layer shell structure for a vehicle that includes a plurality of high tensile fabric barrier segments.

FIG. 7 is a schematic of an interior portion of a multi-layer shell structure 100 for a vehicle. The multi-layer shell structure 100 includes a windward, or leading, side 201 and a leeward, or trailing, side 202. The vehicle may be configured so that the windward side 201 of the multi-layer shell structure 100 is positioned toward the direction of re-entry into an atmosphere with the leeward side 202 positioned opposite the windward side 201. In this configuration, the temperatures on the windward side 201 of the multi-layer shell structure 100 may greatly exceed the temperatures on the leeward side 202. The windward side 201 of the multi-layer shell structure 100 may include a plurality of high tensile fabric barrier segments 105 as shown in FIG. 7 to shield the interior of the vehicle from the temperatures experienced on the windward side 201 of the multi-layer shell structure 100.

Figure 8:
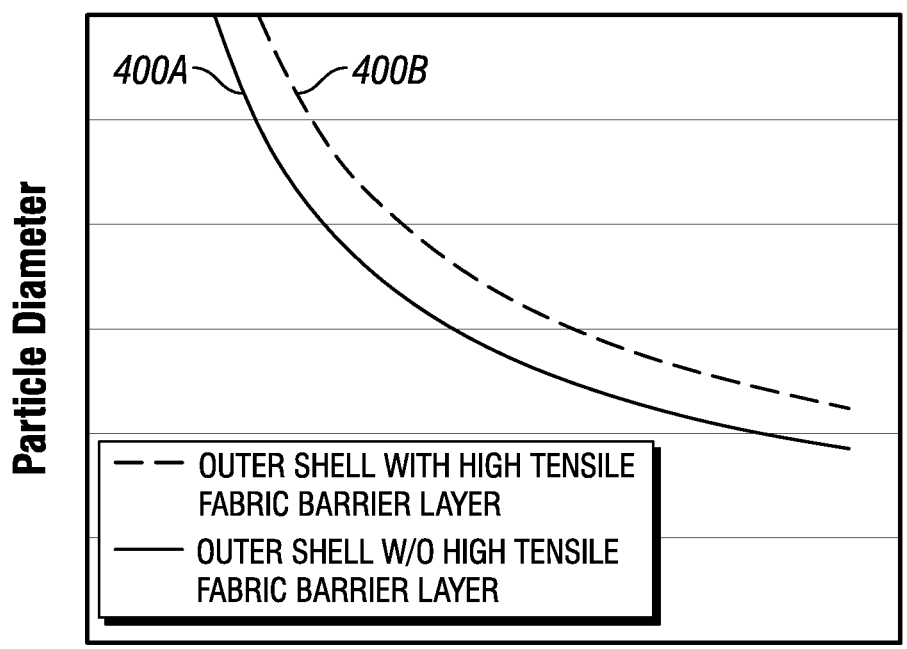
FIG. 8 is a graph indicating the impact resistance of a multi-layer shell structure.

In addition to the high tensile fabric barrier layer 105 preventing high temperature gases 300 from entering the annulus 120, the high tensile fabric barrier layer 105 may increase the overall impact strength of the multi-layer shell structure 100. As the diameter of a particle increases, the velocity of the particle needed to create a hole in a multi-layer shell structure 100 decreases. FIG. 8 is a graph showing a ballistic limit of a multi-layer shell structure 100 with and without a high tensile fabric barrier layer 105. The line 400A indicates a ballistic limit for a multi-layer shell structure 100 and line 400B indicates a ballistic limit for a multi-layer shell structure 100 with a high tensile fabric barrier layer 105 added to the multi-layer shell structure 100. As indicated in FIG. 8, the ballistic limit of the multi-layer shell structure 100 increases with the addition of a high tensile fabric barrier layer 105.

Figure 9:
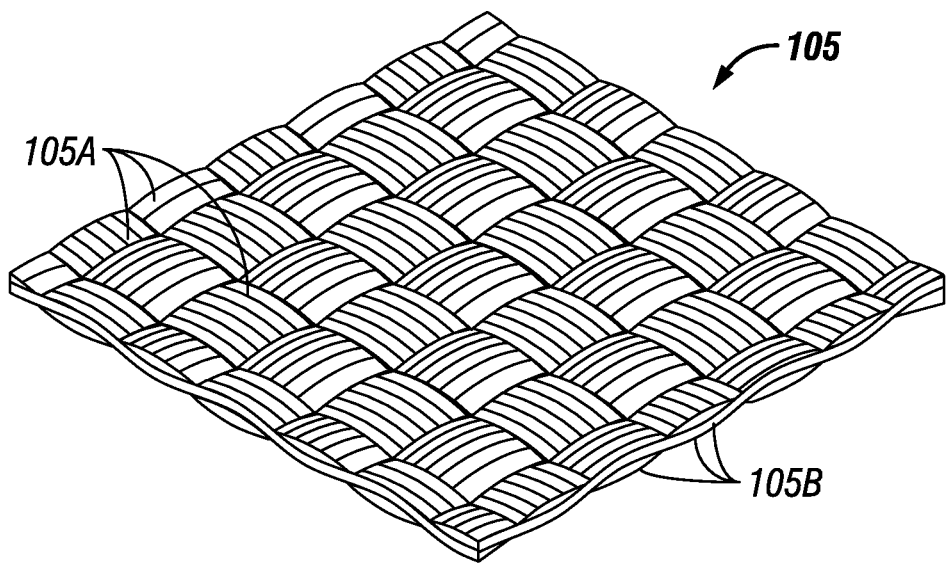
FIG. 9 is a schematic of an example of a high tensile fabric barrier layer.

FIG. 9 is a schematic of an example of a high tensile fabric barrier layer 105. The high tensile fabric barrier layer 105 is comprised of high tensile yarn 105A woven into high tensile fabric plies 105B. Multiple high tensile fabric plies 105B are then woven together to form the high tensile fabric barrier segment 105. The high tensile fabric barrier segment or layer 105 may be formed of various number of high tensile fabric plies 105B. The thickness and strength of the high tensile fabric barrier segment or layer 105 may be increased by increasing the total number of high tensile fabric plies 105B. In one example, the high tensile fabric barrier layer 105 may be comprised of at least ten (10) high tensile fabric plies 105B.

Figure 10:
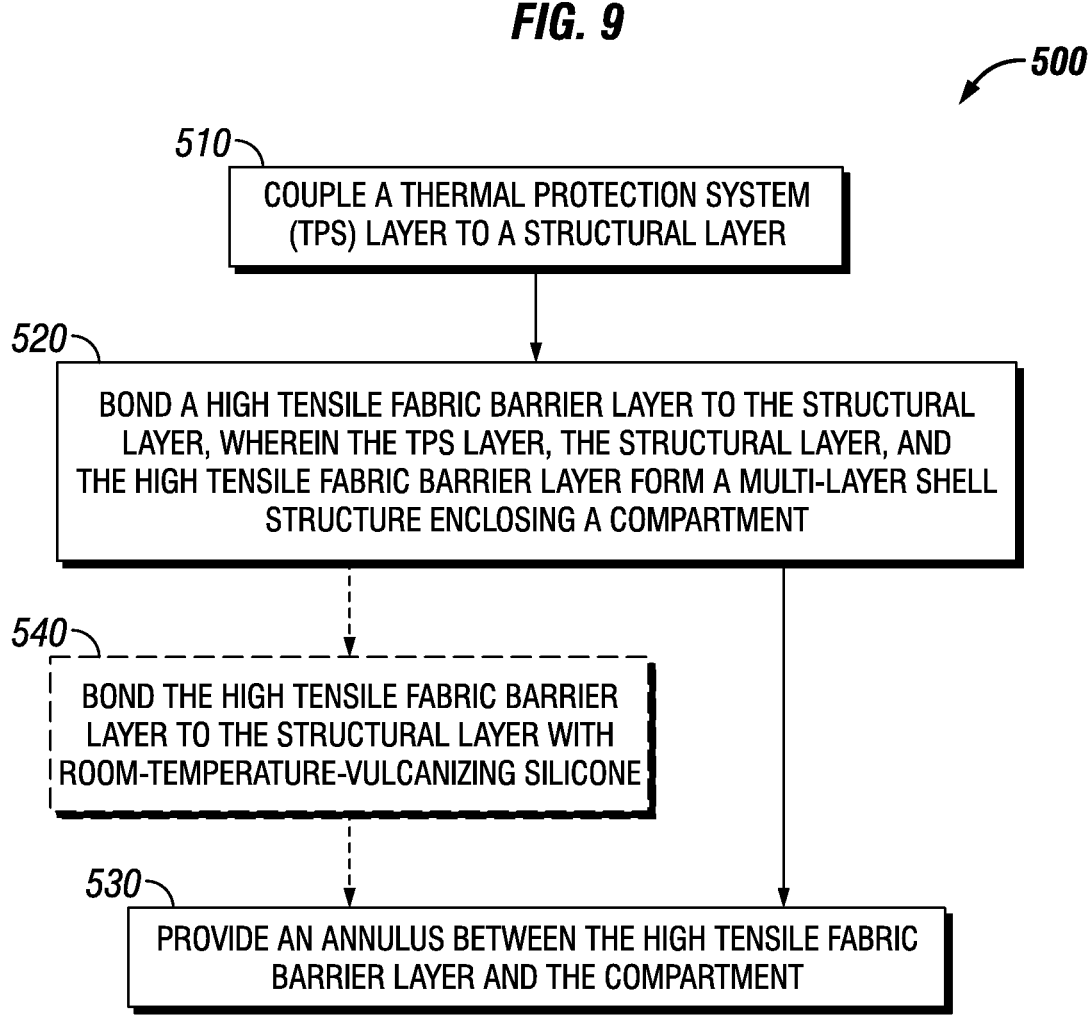
FIG. 10 is a flow chart of one example of a method of providing a multi-layer shell structure for a vehicle.

FIG. 10 is a flow chart for a method 500 of providing a multi-layer shell structure for a vehicle. For example, the vehicle may be a spacecraft designed to re-enter into an atmosphere. The method 500 includes coupling a thermal protection system (TPS) layer to a structural layer, at 510. For example, a TPS layer 101 may be bonded to a structural layer 103 via a bonding layer 102. The bonding layer 102 may be room-temperature-vulcanizing silicone or the like. The method 500 includes bonding a high tensile fabric barrier layer to the structural layer, wherein the TPS layer, the structural layer, and the high tensile fabric barrier layer form a multi-layer shell structure enclosing a compartment, at 520. For example, a high tensile fabric barrier layer 105 may be bonded to a structural layer 103, which is bonded to a TPS layer 101 for form a multi-layer shell structure 100.

The method 500 includes providing an annulus between the high tensile fabric barrier layer and the compartment, at 530. For example, an annulus 120 may be positioned between a compartment 130 within an inner shell 110 and a high tensile fabric barrier layer 105. The high tensile fabric barrier layer 105 being configured to prevent the flow of high temperature gases 300 into the annulus 120 in the event a hole is created in a portion of the multi-layer shell structure 100. The method 500 may include bonding the high tensile fabric layer to the structural layer with room-temperature-vulcanizing silicone, at 540.

Although this disclosure has been described in terms of certain embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. A multi-layer shell structure for a vehicle comprising:
a thermal protection system (TPS) layer;
a structural layer connected to the TPS layer, the structural layer being a honeycomb structure positioned between composite faceplates; and
a high tensile fabric barrier layer bonded to the structural layer, wherein the structural layer is positioned between the high tensile fabric barrier layer and the TPS layer;
an inner shell enclosing a compartment; and
an annulus that surrounds an entire perimeter of the inner shell, wherein the high tensile fabric barrier layer is positioned directly adjacent to the annulus.

2. The multi-layer shell structure of claim 1, wherein the high tensile fabric barrier layer creates a seal on an exterior of the structural layer.

3. The multi-layer shell structure of claim 1, wherein the annulus is between an exterior of the inner shell and the high tensile fabric barrier layer, wherein the high tensile fabric barrier layer prohibits an entry of gas into the annulus in the event a hole is created through the TPS layer and the structural layer.

4. The multi-layer shell structure of claim 3, wherein the high tensile fabric barrier layer continues to prohibit the entry of gas into the annulus up to a temperature of at least 800 degrees Fahrenheit.

5. The multi-layer shell structure of claim 3, wherein the annulus has a pressure below a pressure exterior of the TPS layer.

6. The multi-layer shell structure of claim 1, wherein the inner shell comprises aluminum.

7. The multi-layer shell structure of claim 1, wherein the high tensile fabric barrier layer is bonded to the structural layer via a layer of room-temperature-vulcanizing silicone.

8. The multi-layer shell structure of claim 1, wherein the high tensile fabric barrier layer has a tensile strength of 3,000 MPa or greater.

9. The multi-layer shell structure of claim 1, wherein the high tensile fabric barrier layer comprises a plurality of plies of high tensile fabric woven together to form the high tensile fabric barrier layer.

10. The multi-layer shell structure of claim 9, wherein the high tensile fabric barrier layer comprises at least ten plies of high tensile fabric.

11. The multi-layer shell structure of claim 1, further comprising a first layer of bonding material and a second layer of bonding material, wherein the first layer of bonding material is positioned between the TPS layer and the structural layer and wherein the second layer of bonding material is positioned between the structure layer and the high tensile fabric barrier layer.

12. A spacecraft comprising:
a multi-layer shell structure having a windward side and a leeward side, wherein the multi-layer shell structure comprises a thermal protection system (TPS) layer and a structural layer connected to the TPS layer, the structural layer being a honeycomb structure positioned between composite faceplates;
an inner shell enclosing a compartment positioned within the multi-layer shell structure;
an annulus that surrounds an entire perimeter of the inner shell;
a plurality of high tensile fabric barrier segments on the windward side of the multi-layer shell structure, wherein each of the plurality of high tensile fabric barrier segments are bonded to the structural layer of the multi-layer shell structure, wherein each of the plurality of high tensile fabric barrier segments are positioned directly adjacent to the annulus, wherein the structural layer is positioned between the TPS layer and the plurality of high tensile fabric barrier segments; and
wherein the plurality of high tensile fabric barrier segments prohibits an entry of gas into the annulus in the event a hole is created through a portion of the multi-layer shell structure.

13. The spacecraft of claim 12, wherein each of the plurality of high tensile fabric barrier segments creates a seal on an exterior of the structural layer.

14. The spacecraft of claim 13, wherein room-temperature-vulcanizing silicone bonds each segment of the plurality of high tensile fabric barrier segments to the structural layer.

15. The spacecraft of claim 14, wherein the annulus has a pressure below a pressure exterior of the TPS layer.

16. The spacecraft of claim 15, wherein the plurality of high tensile fabric barrier segments are comprised of high tensile yarn woven into high tensile fabric plies, wherein each of the plurality of high tensile fabric barrier segments comprise multiple high tensile fabric plies woven together to form each of the plurality of high tensile fabric barrier segments.

17. The spacecraft of claim 16, wherein each of the plurality of high tensile fabric barrier segments comprises at least ten high tensile fabric plies.

18. The spacecraft of claim 12, wherein the plurality of high tensile fabric barrier segments have a tensile strength of 3,000 MPa or greater.

19. A method of providing a multi-layer shell structure for a vehicle comprising:
  coupling a thermal protection system (TPS) layer to a structural layer, the structural layer being a honeycomb structure positioned between composite faceplates;
  bonding a high tensile fabric barrier layer to the structural layer, wherein the TPS layer, the structural layer, and the high tensile fabric barrier layer form the multi-layer shell structure enclosing an inner shell enclosing a compartment, wherein the structural layer is positioned between the TPS layer and the high tensile fabric barrier layer; and
  providing an annulus between the high tensile fabric barrier layer and the inner shell wherein the high tensile fabric barrier layer is directly adjacent to the annulus, wherein the annulus surrounds an entire perimeter of the inner shell.

20. The method of claim 19, wherein bonding the high tensile fabric barrier layer to the structural layer further comprises bonding the high tensile fabric barrier layer to the structural layer with room-temperature-vulcanizing silicone.

* * * * *